(12) United States Patent
Stirniman et al.

(10) Patent No.: US 6,665,077 B1
(45) Date of Patent: Dec. 16, 2003

(54) METHOD AND APPARATUS FOR ENHANCED SENSITIVITY FLY HEIGHT TESTING AND MEASUREMENT

(75) Inventors: Michael Joseph Stirniman, Fremont, CA (US); David Shiao-Min Kuo, Palo Alto, CA (US); Thomas Roy Pitchford, Bloomington, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 97 days.

(21) Appl. No.: 09/884,929

(22) Filed: Jun. 21, 2001

Related U.S. Application Data

(60) Provisional application No. 60/243,206, filed on Oct. 24, 2000.

(51) Int. Cl.$^7$ ............................................. G01B 11/02
(52) U.S. Cl. ............................................................ 356/507
(58) Field of Search ..................... 356/507, 630, 356/243.3

(56) References Cited

U.S. PATENT DOCUMENTS

| | | | |
|---|---|---|---|
| 5,473,431 A | * | 12/1995 | Hollars et al. .............. 356/507 |
| 5,715,060 A | * | 2/1998 | Sides ......................... 356/623 |
| 5,808,736 A | * | 9/1998 | Womack et al. .......... 356/243.3 |
| 5,953,125 A | * | 9/1999 | de Groot ..................... 356/492 |
| 6,404,504 B2 | * | 6/2002 | Liu et al. .................... 356/507 |
| 2002/0018214 A1 | * | 2/2002 | Liu et al. .................... 356/507 |

* cited by examiner

Primary Examiner—David V. Bruce
Assistant Examiner—Thomas Artman
(74) Attorney, Agent, or Firm—McDermott, Will & Emery

(57) ABSTRACT

A method and apparatus for performing interferometric measurement/testing of flying heights of read-write head sliders utilizing an improved rotating disk, the disk having a central opening for use with a spindle for rotation about a central axis, the disk comprising:

a substrate comprised of a light transmissive material and including a pair of opposed, smooth, major surfaces; and a wear-resistant, protective overcoat layer on one of the major surfaces for improving the tribological properties thereof;

wherein the optical properties of the one surface of the disk are optimized for enhancing the sensitivity of the interferometric measurement/testing by increasing the intensity of reflected light received by a detector of the apparatus.

18 Claims, 5 Drawing Sheets

METHOD AND APPARATUS FOR ENHANCED SENSITIVITY FLY HEIGHT TESTING AND MEASUREMENT

CROSS-REFERENCE TO PROVISIONAL APPLICATION

This application claims priority from U.S. provisional patent application Ser. No. 60/243,206, filed Oct. 24, 2000, the entire disclosure of which is incorporated herein by reference.

FIELD OF THE INVENTION

The present invention relates to method and apparatus for performing measurement/testing of the flying height of read-write head sliders utilized in disk-type data/information recording, storage, and retrieval systems. More particularly, the present invention relates to method and apparatus for performing flying height measurement/testing with increased sensitivity at very low. flying heights on the order of $5\mu$ inches or less, e.g., $1\mu$ inch or less.

BACKGROUND OF THE INVENTION

Thin film magnetic and magneto-optical ("MO") recording media are conventionally employed in disk form for use with disk drives for storing large amounts of data in magnetizable form. Typically, one or more disks are rotated on a central axis in combination with data transducer heads. In operation, a typical contact start/stop ("CSS") method commences when the head begins to slide against the surface of the disk as the disk begins to rotate. Upon reaching a predetermined high rotational speed, the head floats in air at a predetermined distance from the surface of the disk due to dynamic pressure effects caused by the air flow generated between the sliding surface of the head and the disk. During reading and recording operations, the transducer head is maintained at a controlled distance from the recording surface, supported on a bearing of air as the disk rotates, such that the head can be freely moved in both the circumferential and radial directions, allowing data to be recorded on and retrieved from the disk at a desired position. Upon terminating operation of the disk drive, the rotational speed of the disk decreases and the head again begins to slide against the surface of the disk and eventually stops in contact with and pressing against the disk. Thus, the transducer head contacts the recording surface whenever the disk is stationary, accelerated from the static position, and during deceleration just prior to completely stopping. Each time the head and disk assembly is driven, the sliding surface of the head repeats the cyclic sequence consisting of stopping, sliding against the surface of the disk, floating in air, sliding against the surface of the disk, and stopping.

It is considered desirable during reading and recording operations, and for obtainment of high areal recording densities, to maintain the transducer head as close to the associated recording surface as is possible, i.e., to minimize the "flying height" of the head slider. Thus, a smooth recording surface is preferred, as well as a smooth opposing surface of the associated transducer head, thereby permitting the head and the disk surface to be positioned in close proximity, with an attendant increase in predictability and consistent behavior of the air bearing supporting the head during motion.

As should be evident from the above, an experimental method for verification and testing of the fly height of the head slider during both the design and production phases of read-write heads for rotating disk magnetic and MO storage media is necessary. At present, three (3) wavelength interferometry, as for example, disclosed in U.S. Pat. No. 5,280,340 to C. Lacey, the entire disclosure of which is incorporated herein by reference, is the most commonly employed technique for direct measurement of fly heights. According to this technique, a test apparatus (e.g., such as manufactured by Phase Metrics, Inc., San Diego, Calif.) is utilized which comprises an optically flat, very smooth, light transparent (e.g., glass), rotating disk, typically coated on a first (e.g., lower or back side) with a very thin (e.g., 0.5–1.0 nm) layer of a perfluoropolyether lubricant, and a means for controllably positioning a head slider at a very small spacing (i.e., flying height or air gap) from the first surface of the disk. As shown in FIG. 1, white light emanating from a suitable source impinges the second (i.e., upper or front side) surface of the disk (illustratively at substantially normal incidence) and is transmitted through the disk. A first portion of the transmitted incident light travels through the air gap d between the first surface of the disk and the head slider, and reflected thereat back through the disk for ultimate receipt by a suitable detector positioned above the second (front side) surface of the disk; whereas a second portion of the transmitted incident light is reflected at the first (back side) surface of the disk back through the disk for ultimate receipt by the detector. The first and second portions of the transmitted light reflected from the head slider surface and from the first (back side) surface of the disk, respectively, are both constructively and destructively combined by interference in the space before the detector to yield a detector output which produces an intensity vs. wavelength pattern, depending upon the spacing (flying height) between the glass disk and the head slider (the preceding assumes that any portion of the incident light reflected from the second or front side surface of the glass disk is small and that any interference effect resulting therefrom is very small due to the thickness of the disk being much greater than the flying height d).

More specifically, and with reference to FIG. 2, the total reflected light intensity vs. wavelength resulting from the constructive and destructive interference of the first and second portions of the reflected incident light is modulated at a specific air gap or flying height d to produce a generally sinusoidally-shaped intensity vs. wavelength pattern having spaced-apart maxima and minima, and is compared with a calibration curve to determine the actual flying height. If incident light of a particular wavelength is utilized for the measurement, a half-cycle of the reflected intensity modulation corresponds to a change in the air gap or flying height d equal to one quarter (¼) of the particular incident wavelength. For example, for yellow/green incident light of 560 nm wavelength, the wavelength spacing between adjacent peaks of reflected light intensity of the intensity vs. wavelength pattern corresponds to a change in air gap or flying height of about 140 nm.

However, unlike typical interferometric measurements, the distances or spacings to be measured in air gap or flying height applications are much less than the wavelengths of the light utilized for the measurement, typically on the order of 25 nm or less; consequently, only a small portion of the peak-to-peak reflected light intensity vs. wavelength modulation pattern can be utilized for flying height measurement. Therefore, in order to maximize the sensitivity of the measurement, it is advantageous for the air gaps or flying heights corresponding to the relatively slowly changing reflected light intensities at the maximum and minimum of the modulation pattern of the reflected light intensity to be far from the air gap or flying height region of interest, where the reflected light intensity is desired to change rapidly with change in air gap or flying height. Further, in order to maximize measurement sensitivity at spacings of 25 nm or less, it is considered essential that overall intensity losses arising from the disk substrate due to, inter alia, internal reflection and absorption within the glass disk and external reflection and scattering therefrom, be minimized.

As indicated above, the continuing requirement for decreased flying heights for obtaining increased areal recording densities of magnetic recording media has necessitated continuing improvements in the sensitivity and accuracy of flying height measurements at very low head-to-disk spacings. However, accurate determination of flying heights below about 25 nm utilizing lubricated optical glass disks, as described supra, have become ever more problematic. While the sources or origins of the difficulties are several and varied, they are, in essence, dominated by the fact that the glass material utilized for the disk is a poor tribological surface for interaction with head sliders which are typically provided at their sliding surface(s) with a wear-resistant coating, e.g., of diamond-like carbon ("DLC"). Moreover, in addition to physical damage imparted to the glass disk surface and the head slider due to their intermittent contacting as in the CSS operation described above, the head flying over the lubricant-coated glass disk surface often incurs undesirable lubricant/contaminant buildup, resulting in alteration of the air bearing characteristics and instability of the flying height.

While it is well known that addition of a lubricated hard carbon overcoat (e.g., of DLC) to a rotating disk surface can significantly improve the tribological performance thereof by affording protection against friction and wear induced by contact with the DLC-coated head slider, a difficulty arises in that the optical properties of sputtered carbon (utilized for the DLC overcoat) are such that at the minimum thickness (i.e., about 5 nm) necessary to improve the tribology of the head slider-disk interface, the total change in reflected light intensity at the detector during interferometric air gap or flying height measurement as described above, e.g., for green-yellow light of about 562 nm wavelength, over a fly height range of from near 0 to about 25 nm, is reduced to about one-fourth (¼) of the intensity change obtained with bare (i.e., uncoated) glass. The disadvantageous reduction in intensity change attendant upon the use of glass disks with lubricated DLC overcoats, hence measurement sensitivity reduction, is attributed both to increased internal reflection within the glass disk at the disk/DLC interface due to the poor refractive index (n) match of the two materials, and to an increased amount of light absorption and scattering within the DLC layer.

In addition to the reduction in measurement sensitivity attributable to the above-described optical effects such as absorption and scattering, an additional reduction in measurement sensitivity results from the fact that the composite optical properties of carbon-coated glass substrates are such that the position of the minimum in the intensity vs. fly height curve is shifted into the fly height region of interest. This phase shift is a general property of multi-layer stacks, and must be taken into consideration as a factor affecting measurement sensitivity, hence precision and accuracy.

Accordingly, there exists a need for an improved method, apparatus, and disk means for performing interferometric measurement/testing of the fly height of a read-write head slider over the surface of a light transparent, rotating disk (e.g., of glass) having at least a wear-resistant protective overcoat layer thereon for improving the tribological properties thereof, which method, apparatus, and disk means overcome the drawbacks and disadvantages associated with the prior art means and methodology and affords increased measurement sensitivity at very low flying heights below about 5µ inches, while providing full compatibility with all aspects of interferometric air gap or flying height measurement/testing.

The present invention addresses and solves problems attendant upon the use of interferometric techniques for the measurement/testing of very small air gaps or flying heights of read-write head sliders utilized in very high areal recording density rotating disk-based, magnetic data/information recording, storage, and retrieval media and systems, while preserving the essential features of conventional interferometric air gap measurement apparatus and technology. An advantage afforded by the present invention is the ability to fabricate and utilize disks required for fly height measurement which comprise coated glass substrates akin to those utilized for magnetic disks, which coated glass substrates may be prepared by means of techniques and instrumentalities conventionally employed in the manufacture of magnetic recording media. Moreover, the means and methodology of the present invention can be utilized for gap or spacing measurement/testing as may be required for all manner of devices, for example, devices utilizing probe scanning techniques, e.g., Atomic Force Microscopes ("AFM").

DISCLOSURE OF THE INVENTION

An advantage of the present invention is an improved method for performing interferometric measurement/testing of flying heights of read-write head sliders utilized in e.g., magnetic data/information recording, storage, and retrieval.

Another advantage of the present invention is an improved rotatable disk for use in performing interferometric measurement/testing of flying heights of read-write head sliders.

Still another advantage of the present invention is an improved apparatus for performing measurement/testing of flying heights of read-write head sliders of data/information recording, storage, and retrieval systems.

Additional advantages and other aspects and features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to the present invention, the foregoing and other advantages are obtained in part by a method for performing interferometric measurement/testing of the fly height of a read-write head slider over a surface of a rotating disk 10, as shown in FIG. 7, the disk surface having at least a wear-resistant, protective overcoat layer 14 thereon for improving tribological properties thereof, the method comprising transmitting at least a portion of an incident light beam through the rotating disk for reflection by an air bearing surface of the head slider facing the disk surface through an air gap, the method further comprising optimizing the optical properties of the disk surface for enhancing the sensitivity of the interferometric measurement/testing by increasing the intensity of reflected light received by a suitable detector.

According to embodiments of the present invention, the protective overcoat layer 14 comprises a material having a high refractive index from about 1.8 to about 2.4 (at an interferometric measurement wavelength of about 562 nm), e.g., a diamond-like carbon (DLC) material; and the disk surface further comprises a lubricant topcoat layer 22 over the protective overcoat layer 14.

In accordance with a particular embodiment of the present invention, the disk 10 comprises a light transmissive substrate 12 having a high refractive index from about 1.9 to about 2.5, the high refractive index substrate 12 being index-matched to the high refractive index protective overcoat layer 14, whereby loss of reflected light intensity due to internal reflection within the disk 10 is substantially eliminated, or at least reduced, and the phase shift characteristic of multi-layer stacks is minimized, or at least reduced; e.g., the protective overcoat layer 14 comprises a high refractive index, diamond-like carbon (DLC) material and the disk 10 comprises a high refractive index glass substrate 12.

According to another embodiment of the present invention, the disk 20 comprises a light transmissive substrate 18 having a low refractive index from about 1.4 to about 1.6, as shown in FIG. 8, with an underlayer 22 of a material having a very high index of refraction n from about 1.9 to about 2.6 and a very low extinction coefficient k interposed between the disk surface and said high refractive index protective overcoat layer 14, with the primary considerations being both the gain or loss in measurement sensitivity due to the phase shift and intensity loss(es). For example, the very high refractive index, very low extinction coefficient underlayer 22 comprises a material selected from the group consisting of ZnS, SiN, $TiO_2$, $ZrO_2$, $Ta_2O_5$, $HfO_2$, TiN, BN, and multi-layer metal structures, with ZnS and SiN presently preferred; the high refractive index protective overcoat layer 14 comprises a diamond-like carbon (DLC) material; and the thickness of each of the protective overcoat layer 14 and underlayer 22 is selected to provide enhancement in reflected light intensity received by the detector for air gaps, hence fly heights of the head slider, of about $5\mu$ inches and below, e.g., for air gaps not greater than about $1\mu$ inch.

Another aspect of the present invention is a disk 10 for use in an apparatus for performing interferometric measurement/testing of flying heights of read-write head sliders, the disk 10 having a central opening for use with a spindle for rotation about a central axis, the disk 10 comprising:

a substrate 12 comprised of a light transmissive material and including a pair of opposed, smooth, major surfaces; and a wear-resistant, protective overcoat layer 14 on one of the major surfaces for improving the tribological properties thereof;

wherein the optical properties of the one surface of the disk 10 are optimized for enhancing the sensitivity of the interferometric measurement/testing by increasing the intensity of reflected light received by a detector of said apparatus.

According to embodiments of the present invention, the protective overcoat layer 14 comprises a diamond-like carbon (DLC) material having a high refractive index from about 1.8 to about 2.4 (at an interferometric measurement wavelength of about 562 nm); and a lubricant topcoat layer 16 is provided over the protective overcoat layer 14.

In accordance with an embodiment of the present invention, the light transmissive substrate 12 comprises a glass material having a high refractive index from about 1.9 to about 2.5, the high refractive index glass material being index-matched to the high refractive index DLC material of the protective overcoat layer 14, whereby loss of reflected light intensity due to internal reflection within the disk 10 is substantially eliminated, or at least reduced.

According to another embodiment of the present invention, the light transmissive substrate 18 comprises a glass material having a low refractive index from about 1.4 to about 1.6; and the disk 20 further comprises an underlayer 22 of a material having a very high index of refraction n from about 1.9 to about 2.6 and a very low extinction coefficient k from 0 to about 0.5 interposed between the one surface of the low refractive index glass substrate 18 and the high refractive index, protective overcoat layer 14 of DLC material; wherein the very high refractive index, very low extinction coefficient underlayer 22 comprises a material selected from the group consisting of ZnS, SiN, $TiO_2$, $ZrO_2$, $Ta_2O_5$, $HfO_2$, TiN, BN, and multi-layer metal structures, with ZnS and SiN presently preferred; and the thickness of each of the protective overcoat layer 14 and the underlayer 22 is selected to provide enhancement in reflected light intensity received by the detector for flying heights of the head slider between about 0 and about $5\mu$ in.

Yet another aspect of the present invention is an apparatus for performing interferometric measurement/testing of flying heights of read-write head sliders, comprising:

a rotatable disk 10 comprised of a light transmissive substrate material; and means for optimizing the optical properties of one side of the disk 10 for enhancing the sensitivity of the measurement/testing for flying heights between about 0 and about $5\mu$ in.

According to embodiments of the present invention, the one side of the disk 10 includes protective overcoat 14 and lubricant topcoat 16 layers thereon.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, wherein.

DESCRIPTION OF THE INVENTION

Figure 1:
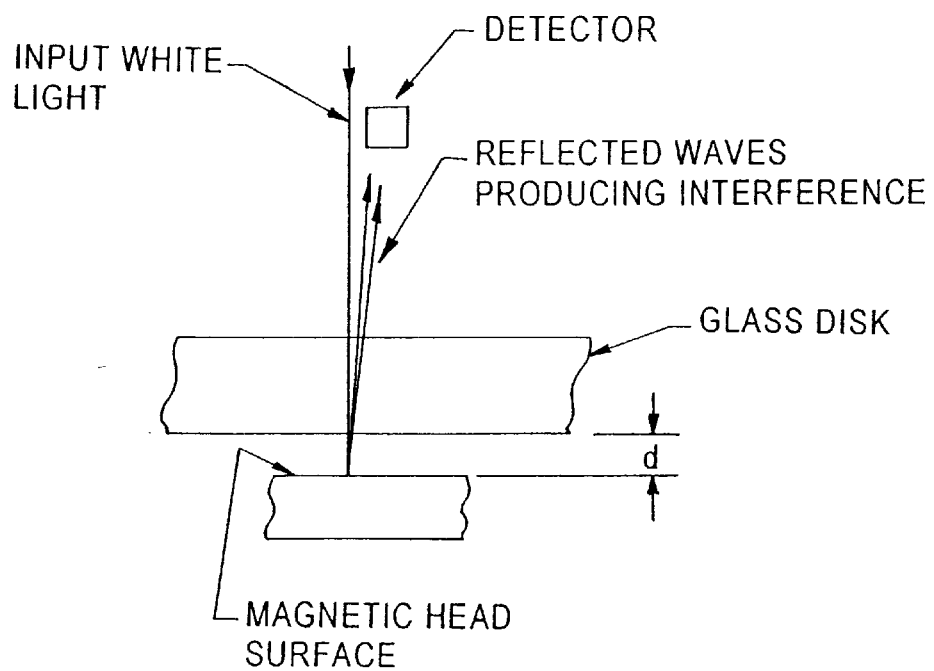
FIG. 1 schematically illustrates, in simplified cross-sectional form, the critical optical paths involved in the measurement of an air gap or flying height "d" by means of interferometry.
Figure 2:
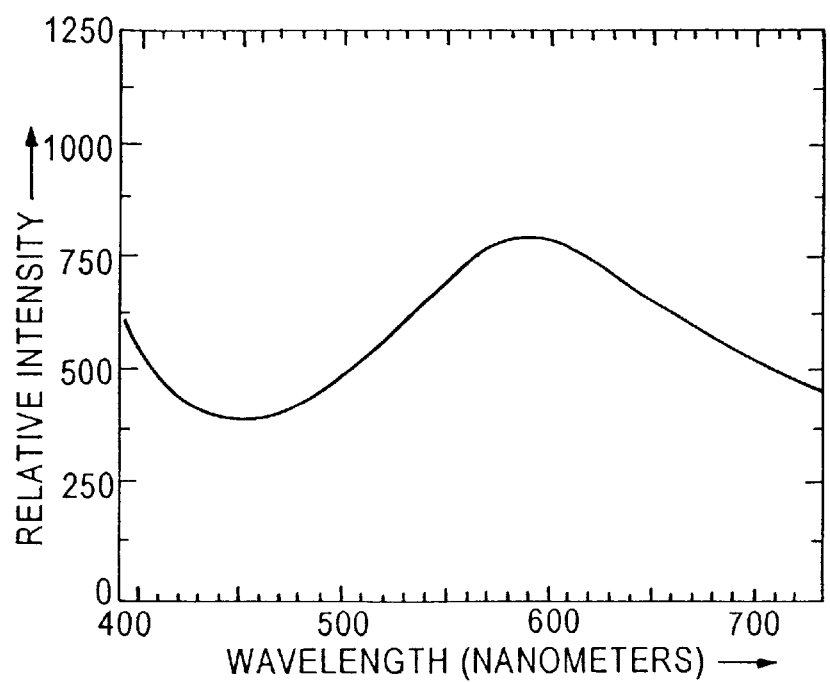
FIG. 2 is a sample of a graph of relative reflected white light intensity vs. wavelength obtained in an interferometric measurement of air gap or flying height utilizing an optical path arrangement as in FIG. 1.

The present invention is based upon the recognition that the sensitivity of interferometric measurement/testing of the air gap or flying height of a read-write head slider operating at very low spacings from a rotating disk 10, 20, 30 surface, e.g., from about 0 to about 5μ inches, can be significantly enhanced by optimizing the optical properties of the surface of the light transmissive rotating disk 10, 20, 30 facing the surface of the head slider across the air gap.

A key feature according to an embodiment of the present invention is the use of a light transmissive disk 10 comprised of a high index of refraction substrate material 12, which substrate material 12 is index-matched to a high refractive index, protective overcoat layer 14, whereby loss of reflected light intensity due to internal reflection within the disk 10 is substantially eliminated, or at least reduced; whereas, a key feature according to another embodiment of the present invention, is the use of a light transmissive disk 20 comprised of a low refractive index material, and an underlayer 22 of a very high refractive index material is provided between the light transmissive disk 20 and the high refractive index protective overcoat layer 14, whereby the intensity of reflected light received by a detector of an interferometric air gap measurement/testing apparatus is substantially increased, thereby providing a corresponding increase in obtainable measurement sensitivity at very small air gaps or flying heights.

More specifically, according to a first embodiment of the present invention, the poor tribological properties of uncoated glass and the poor optical properties of carbon-coated (e.g., DLC-coated) glass are overcome by use of a glass substrate material 12 having a high refractive index (i.e., from about 1.9 to about 2.5) which is better matched to that of the high refractive index (i.e., from about 1.8 to about 2.4) carbon-based protective overcoat 14, typically a DLC material, such as sputtered a-C:H. According to this embodiment, losses in reflected light intensity due to internal reflection at the glass/DLC interface can be reduced, the amount of reduction depending upon the degree of index matching. For example, perfect index matching can provide an intensity sensitivity corresponding to about 85% of that obtainable with bare (i.e., no protective overcoat), lubricated low refractive index glass. However, in this case, as well as in the case of lubricated bare, low refractive index glass, a significant loss in absolute reflected light intensity occurs due to unwanted reflections at the air/a-C:H and air/glass interfaces.

According to a second, more preferable embodiment of the present invention, a greater increase in reflected light intensity, hence an increase in measurement sensitivity of a factor of 2–3 over that obtainable with lubricated, bare low index glass disks, can be obtained by forming a light transmissive disk 20 wherein an appropriately thick (e.g., quarter wavelength) underlayer 22 of a very high refractive index (i.e., having a value of refractive index n from about 1.9 to about 2.6), very low extinction coefficient material (i.e., having a value of extinction coefficient k from about 0 to about 0.5) is sandwiched between a glass substrate 18 of a low refractive index material (i.e., having a value of refractive index n from about 1.4 to about 1.6) and a high refractive index protective overcoat layer 14 (e.g., a DLC material such as sputtered a-C:H having a high refractive index from about 1.8 to about 2.4). According to the invention, suitable high refractive index, low extinction coefficient materials for use according to the second embodiment include, but are not necessarily limited to, materials selected from the group consisting of ZnS, SiN, $TiO_2$, $ZrO_2$, $Ta_2O_5$, $HfO_2$, TiN, BN, and multi-layer metal structures.

Figure 9:
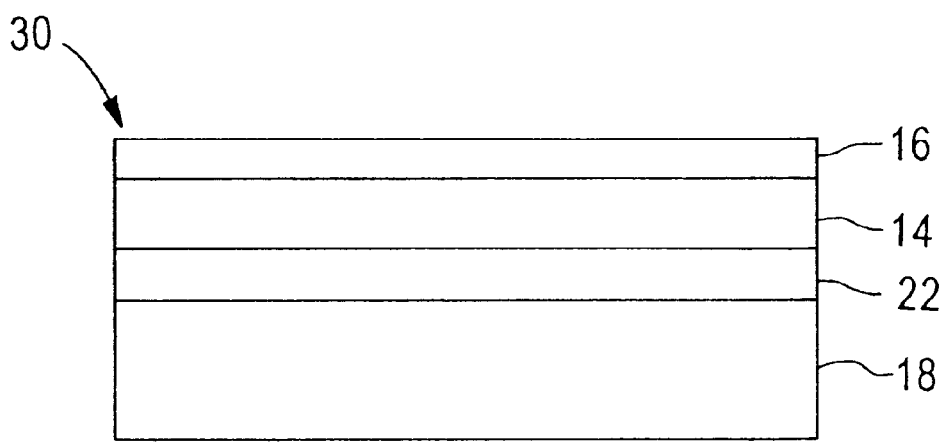
FIG. 9 is an illustration of a disk according to another embodiment of the present invention.

Simulations have been performed in order to evaluate several different materials combinations and layer thicknesses for each of the first and second embodiments, utilizing standard interferometric formulae and calculations, in which the system included, in the optical path, a fly test disk 30, as shown in FIG. 9, comprising, in sequence, of a semi-infinite medium 18 (i.e., the glass disk substrate), quarter wavelength thick high refractive index, low extinction coefficient underlayer 22, protective overcoat 14 (sputtered a-C:H), and lubricant topcoat 16 (a perfluoropolyether); an air gap (i.e., the fly height); and a head slider comprising, in sequence, a DLC-based wear-resistant coating of sputtered a-C:H, a Si-based head underlayer, and a semi-infinite medium (i.e., the head slider body material). The result of the simulation is the calculated real reflectance of the combination as the air gap or fly height is varied over the range from −50 to +150 nm, the calculation being extended into the negative fly height region because the minimum of the reflected intensity vs. fly height curve can occur at theoretically negative fly heights for some combinations of materials. The materials, optical properties, and thicknesses thereof used for the various combinations are given below in Table 1.

TABLE 1

| Layer | Material | n | k | Thickness |
|---|---|---|---|---|
| Substrates | normal glass | 1.53 | 0.0 | semi-infinite |
|  | high index glass | 1.90 | 0.0 | semi-infinite |
|  | ZnS disk | 2.39 | 0.0 | semi-infinite |
| Underlayer | ZnS | 2.39 | 0.0 | 0–100 nm |
|  | SiN | 2.00 | 0.03 | 0–100 nm |
| Overcoat | a-C:H | 1.85 | 1.6 | 5 nm |
| Lubricant | Fluoropolymer | 1.30 | 0.0 | ~5 nm |
| Air Gap | air | 1.0 | 0.0 | −50–150 nm |
| Head Slider | DLC coating | 2.2 | 0.4 | 3.5 nm |
|  | Si Underlayer | 2.53 | 0.0 | 1.5 nm |
|  | Head Slider Mat'l | 2.25 | 0.45 | semi-infinite |

Figure 3A:
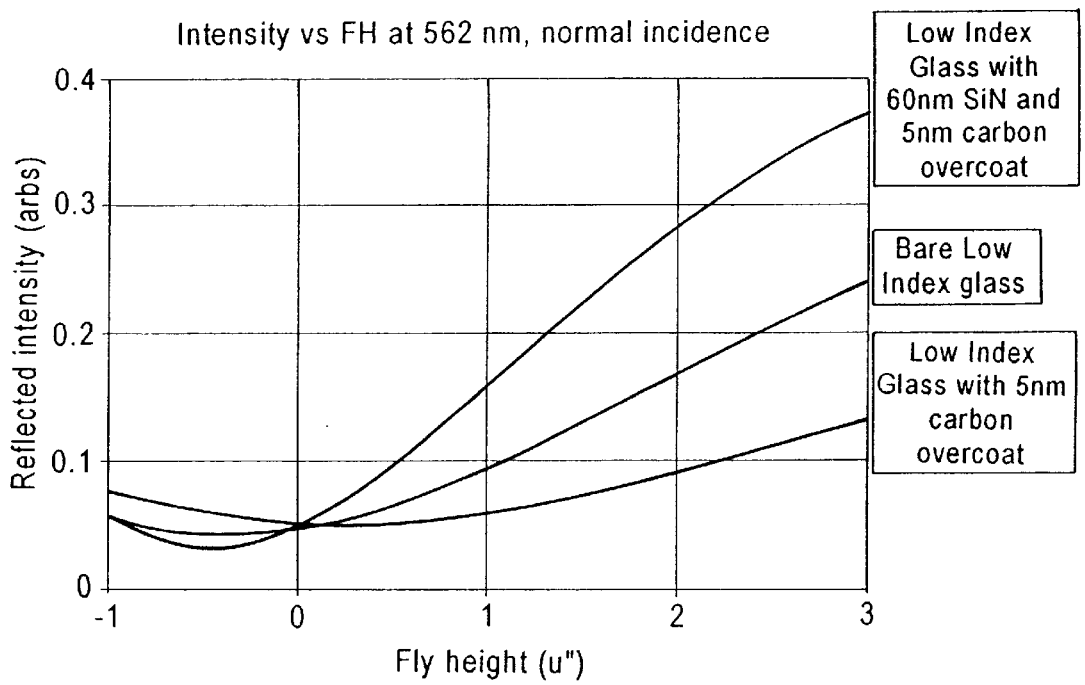
FIGS. 3(A)–3(B) are graphs of calculated relative reflected light intensity vs. fly height ("FH") for various glass disk substrates according to embodiments of the present invention.
Figure 3B:
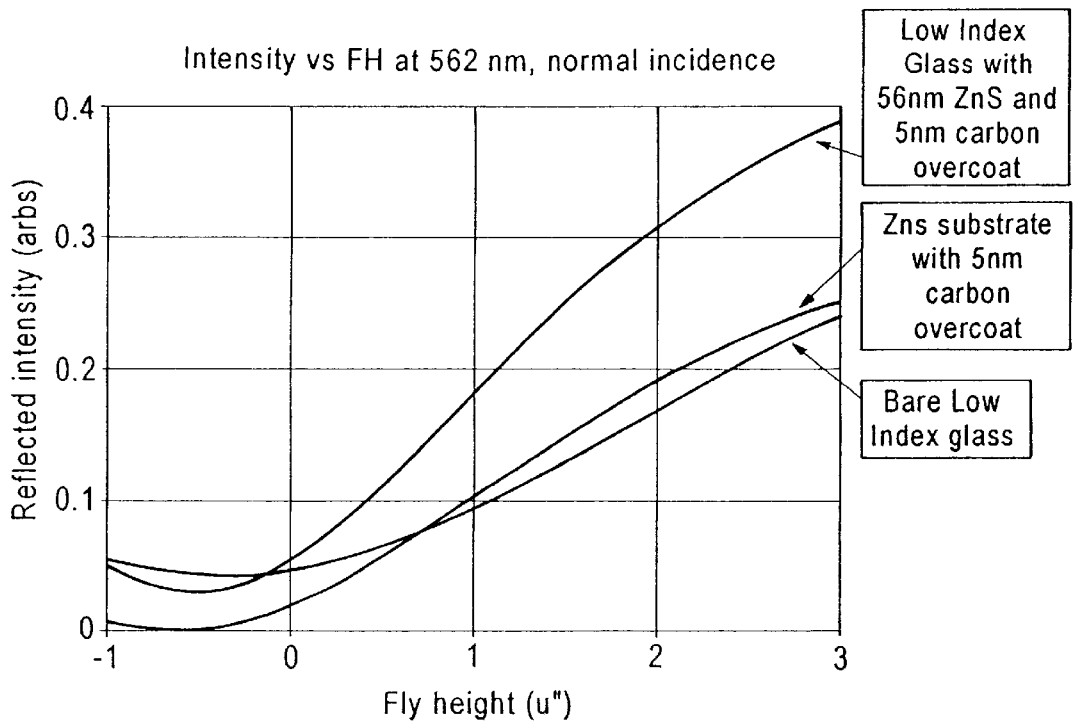

Results of the simulation for the various different combinations of materials and thicknesses thereof are graphically shown in FIG. 3, wherein the abscissa indicates fly heights in the range from −2 to +6μ inches and the ordinate indicates relative reflected light intensities in arbitrary units. Flying height ("FH") measurement sensitivities for the different combinations of materials and thicknesses were estimated from the calculated reflected light intensity changes, over the very low flying height range of 0–1μ inch (i.e., 0 to 25 nm), relative to the reflected light intensity calculated for lubricated bare glass disks. The results are presented in the following Table 2.

TABLE 2

| Figure No. | Configuration | Relative Reflected Light Intensity Change, 0–1 μin. |
|---|---|---|
| 3(A), 3(B) | Bare lubricated low index glass (currently used) | ~100% |
| 3(A) | Low index glass with 5 nm a-C:H DLC layer | ~25% |
| 3(B) | ZnS substrate with 5 nm a-C:H DLC layer | ~175% |
| 3(A) | Low index glass with 60 nm SiN underlayer and 5 nm a-C:H DLC layer | ~240% |
| 3(B) | Low index glass with 56 nm ZnS underlayer and 5 nm a-C:H DLC layer | ~270% |

From the above, it is evident that each of the embodiments according to the present invention, i.e., wherein the refractive indices of the disk substrate 12 and protective overcoat layer 14 are each high and matched, as in the first embodiment; or wherein a very high refractive index, very low extinction coefficient, quarter wavelength thick underlayer 22 is provided between a low refractive index glass substrate 18 and a high refractive index protective overcoat layer 14, as in the second embodiment, can provide a substantial enhancement in total reflected light intensity change which, in turn, yields a significant increase in measurement sensitivity for flying heights in the air gap region below about 1μ inch (i.e., <25 nm).

Figure 4:
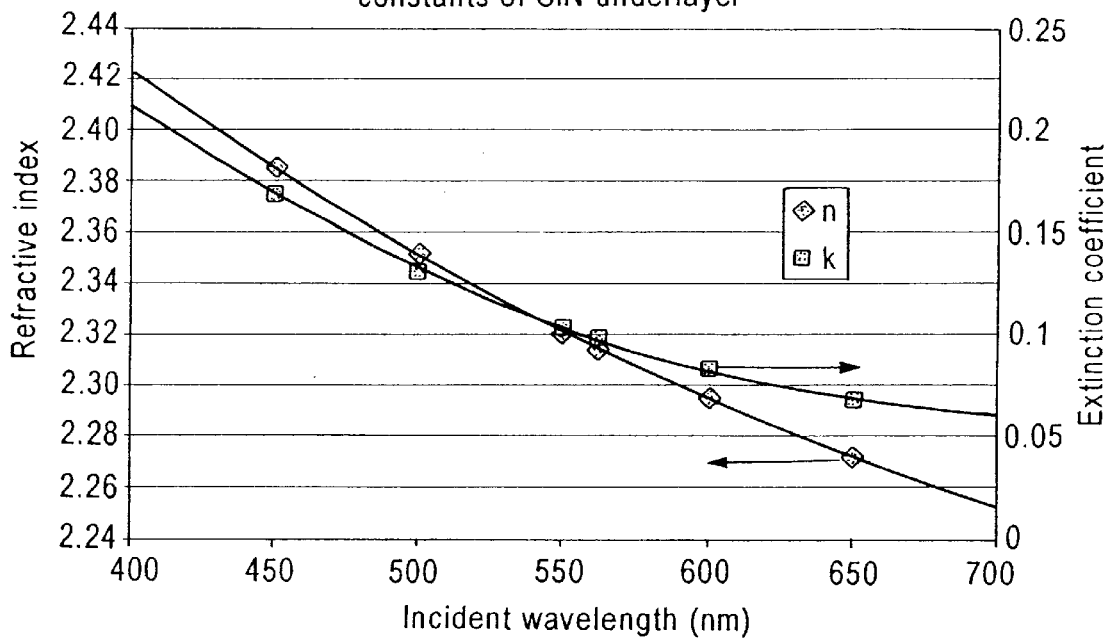
FIGS. 4 and 5 are graphs for showing the variation with wavelength of n and k of SiN and a-C:H, respectively.
Figure 5:
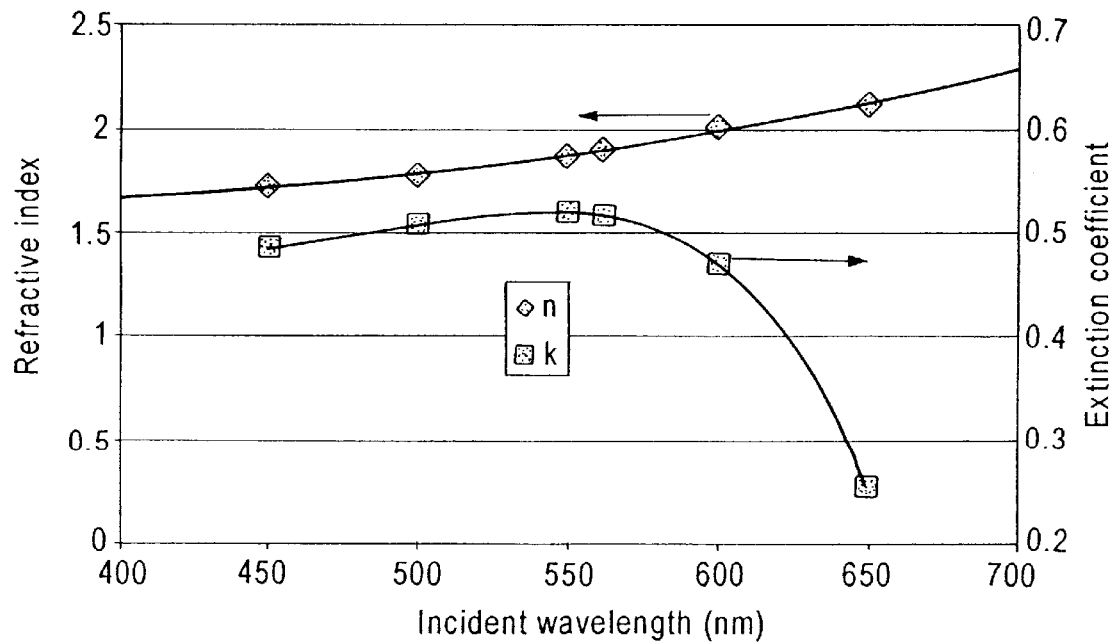

In order to provide further verification of the efficacy of the inventive concept, three (3)-wavelength (i.e., blue, green, and yellow light) flying height measurement/testing was performed with glass disk substrates 18 provided with an about 60 nm thick silicon nitride (SiN) underlayer 22, a protective overcoat layer 14 comprised of an about 5 nm thick layer of hydrogen-doped carbon (a-C:H), wherein n and k of each of SiN and a-C:H are wavelength dependent and determined from the graphs of FIGS. 4 and 5, respectively, and an about 1 nm thick layer of a PFPE (perfluoropolyethylene) lubricant 16. Results are given below in Table 3.

TABLE 3

| | Reflected Light Intensity (arbitrary unit) | |
|---|---|---|
| Light | a-C:H/SiN/Glass Disk | Standard Test Glass Disk |
| Blue | | |
| Max. | 603 | 594 |
| Min. | 472 | 494 |
| Green | | |
| Max | 714 | 657 |
| Min. | 545 | 556 |
| Yellow | | |
| Max. | 695 | 581 |
| Min. | 328 | 357 |
| Fly Height | 0.727 μin. | 0.390 μin. |
| Std. Dev., σ | 0.022 μin. | 0.046 μin. |

Figure 6:
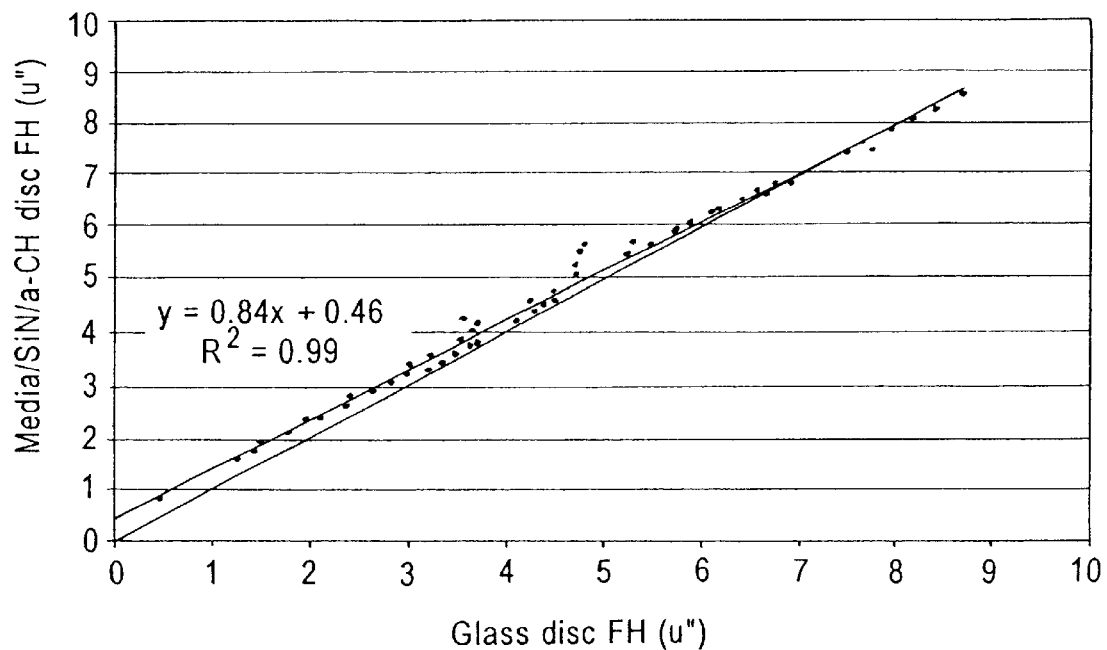
FIG. 6 is a graph for showing the correlation between fly heights measured with standard glass disks and the glass/SiN/a-C:H disks of the present invention.
Figure 7:
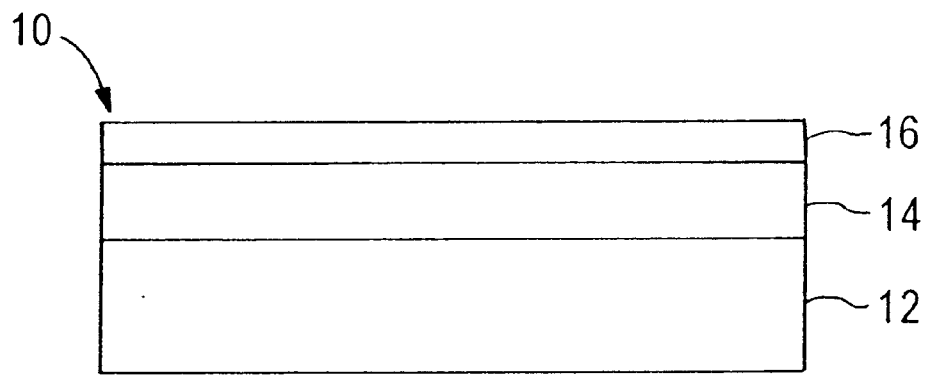
FIG. 7 is an illustration of a disk according to an embodiment of the present invention.
Figure 8:
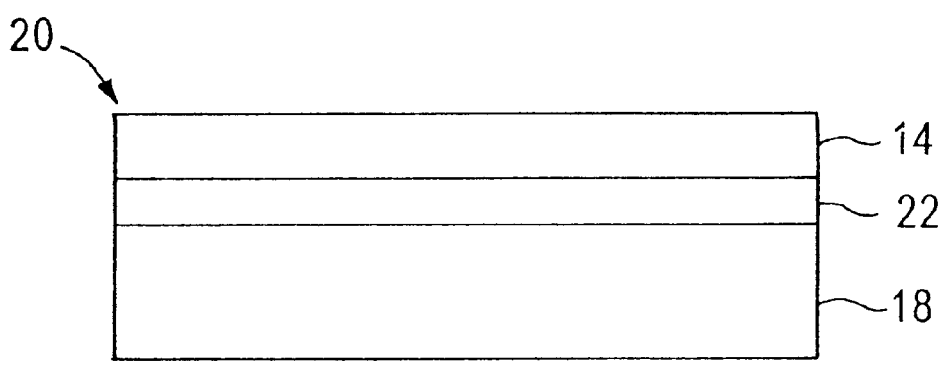
FIG. 8 is an illustration of a disk according to another embodiment of the present invention.

As is apparent from Table 3, for each of the three (3) wavelengths utilized for the interferometric flying height measurement, the glass disk media 30 fabricated according to the invention and including a high refractive index, low extinction coefficient SiN underlayer 22 intermediate the glass substrate 18 and the carbon-based protective overcoat layer 14 agreed with predictions indicated by the above simulations and exhibited a greater change in reflected light intensity between the minimum and maximum of the reflected light intensity vs. wavelength modulation pattern than that provided by the conventional glass disk media 30 not including the underlayer 22 according to the invention. Further, the lower σ value for the fly height measurements with the inventive disk media 30 indicate a better tribological interface, vis-a-vis that of the conventional, i.e., standard, glass disk media. The differences in absolute fly height in the table result from lack of availability of suitable calibration data for the inventive disk media. Finally, FIG. 6 graphically shows the generally good correlation between fly heights measured using a standard glass disk and the a-C:H/SiN/glass disk 30 of the present invention.

Thus, the present invention advantageously provides improved disk media 10, 20, 30 for use in interferometric measurement of very low flying heights of read-write heads such as are utilized in very high areal recording density magnetic media and systems, i.e., below about 1μ in. The inventive media 10, 20, 30 substantially eliminate, or at least reduce unwanted loss in reflected light intensity and provide a substantial increase in the change in reflected light intensity from minimum to maximum of the reflected light intensity vs. wavelength modulation curve, thereby increasing the sensitivity of fly height measurement at very low fly heights. The disk media 10, 20, 30 of the present invention are especially useful when employed in conjunction with interferometric flying height apparatus utilizing the three (3) wavelength method and enjoy particular utility in the development of high recording density media for computer-related applications. In addition, the inventive media 10, 20, 30 can be readily fabricated by means of conventional methodologies, e.g., sputtering techniques.

In the previous description, numerous specific details are set forth, such as specific materials, structures, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A method for performing interferometric measurement/testing of the fly height of a read-write head slider over a surface of a rotating disk, said disk surface having at least a wear-resistant, protective overcoat layer thereon for improving tribological properties thereof, the method comprising transmitting at least a portion of an incident light beam through said rotating disk for reflection by an air bearing surface of said head slider facing said disk surface through an air gap, wherein said protective overcoat layer comprises a material having a high refractive index from about 1.8 to about 2.4; and wherein said disk comprises a light transmissive substrate having a high refractive index from about 1.9 to about 2.5, said high refractive index substrate being index-matched to said high refractive index protective overcoat layer.

2. The method according to claim 1, wherein said protective overcoat layer comprises a diamond-like carbon (DLC) material.

3. The method according to claim 1, wherein said disk surface further comprises a lubricant topcoat layer over said protective overcoat layer.

4. The method according to claim 1, wherein said protective overcoat layer comprises a high refractive index, diamond-like carbon (DLC) material and said disk comprises a high refractive index glass substrate.

5. A method for performing interferometric measurement/testing of the fly height of a read-write head slider over a surface of a rotating disk, said disk surface having at least a wear-resistant, protective overcoat layer thereon, the method comprising transmitting at least a portion of an incident light beam through said rotating disk for reflection by an air bearing surface of said head slider facing said disk surface through an air gap, wherein said protective overcoat layer comprises a material having a high refractive index from about 1.8 to about 2.4; and wherein said disk comprises a light transmissive substrate having a low refractive index from about 1.4 to about 1.6, with an underlayer of a material having a very high index of refraction from about 1.9 to about 2.6 and a very low extinction coefficient k from about 0 to about 0.5 interposed between said disk surface and said high refractive index protective overcoat layer.

6. The method according to claim 5, wherein said very high refractive index, very low extinction coefficient underlayer comprises a material selected from the group consisting of ZnS, SiN, $TiO_2$, $ZrO_2$, $Ta_2O_5$, $HfO_2$, TiN, BN, and multi-layer metal structures, and said high refractive index protective overcoat layer comprises a diamond-like carbon (DLC) material.

7. The method according to claim 6, wherein said very high refractive index, very low extinction coefficient underlayer comprises SiN or ZnS.

8. The method according to claim 5, wherein the thickness of each of the protective overcoat layer and underlayer is selected to provide enhancement in reflected light intensity received by said detector for air gaps, hence fly heights of said head slider, from about 0 to about $5\mu$ inches.

9. The method according to claim 8, wherein the thickness of each of the protective overcoat layer and underlayer is selected to provide enhancement in reflected light intensity received by said detector for air gaps not greater than about $1\mu$ inch.

10. A disk for use in an apparatus for performing interferometric measurement/testing of flying heights of read-write head sliders, said disk having a central opening for use with a spindle for rotation about a central axis, said disk comprising:

a substrate comprised of a light transmissive material and including a pair of opposed, smooth, major surfaces; and a wear-resistant, protective overcoat layer on one of said major surfaces for improving the tribological properties thereof, wherein said protective overcoat layer comprises a diamond-like carbon (DLC) material having a high refractive index from about 1.8 to about 2.4, and said light transmissive substrate comprises a glass material having a high refractive index from about 1.9 to about 2.5, said high refractive index glass material being index-matched to said high refractive index DLC material of said protective overcoat layer;

wherein the optical properties of said one surface of said disk are optimized for enhancing the sensitivity of said interferometric measurement/testing by increasing the intensity of reflected light received by a detector of said apparatus.

11. The disk as in claim 10, further comprising:

a lubricant topcoat layer over said protective overcoat layer.

12. A disk for use in an apparatus for performing interferometric measurement/testing of flying heights of read-write head sliders, said disk having a central opening for use with a spindle for rotation about a central axis, said disk comprising:

a substrate comprised of a light transmissive material and including a pair of opposed, smooth, major surfaces, wherein said light transmissive substrate comprises a glass material having a low refractive index from about 1.4 to about 1.6;

a wear-resistant, protective overcoat layer on one of said major surfaces, wherein said protective overcoat layer comprises a diamond-like carbon (DLC) material having a high refractive index from about 1.8 to about 2.4; and said disk further comprises an underlayer of a material having a very high index of refraction from about 1.9 to about 2.6 and a very low extinction coefficient from about 0 to about 0.5 interposed between said one surface of said low refractive index glass substrate and said high refractive index, protective overcoat layer of DLC material.

13. The disk as in claim 12, wherein:

said very high refractive index, very low extinction coefficient underlayer comprises a material selected from the group consisting of ZnS, SiN, $TiO_2$, $ZrO_2$, $Ta_2O_5$, $HfO_2$, TiN, BN, and multi-layer metal structures; and the thickness of each of said protective overcoat layer and said underlayer is selected to provide enhancement in reflected light intensity received by said detector for flying heights of said head slider from about 0 to about $1\mu$ in.

14. The disk as in claim 13, wherein:

said very high refractive index, very low extinction coefficient underlayer comprises ZnS or SiN.

15. An apparatus for performing interferometric measurement/testing of flying heights of read-write head sliders, comprising:

a rotatable disk comprised of a light transmissive substrate material, wherein said light transmissive substrate comprises a glass material having a low refractive index from about 1.4 to about 1.6;

wherein one side of said disk includes a protective overcoat layer, wherein said protective overcoat layer comprises a material having a high refractive index from about 1.8 to about 2.4; and said disk further comprises an underlayer of a material having a very high index of refraction from about 1.9 to about 2.6 and a very low extinction coefficient from about 0 to about 0.5 interposed between said one surface of said low refractive index glass substrate and said high refractive index, protective overcoat layer of DLC material.

16. The apparatus as in claim 15, wherein:

said one side of said disk includes a lubricant topcoat layer thereon.

17. An apparatus for performing interferometric measurement/testing of flying heights of read-write head sliders, comprising:

a rotatable disk comprised of a light transmissive substrate material, wherein said light transmissive substrate comprises a glass material having a high refractive index from about 1.9 to about 2.5; and wherein one side of said disk includes a wear-resistant, protective overcoat layer on said disk, wherein said protective overcoat layer comprises a material having a high refractive index from about 1.8 to about 2.4, wherein said high refractive index glass material of said light transmissive substrate is index-matched to said high refractive index DLC material of said protective overcoat layer.

18. The apparatus as in claim 17, wherein:

said one side of said disk further includes a lubricant topcoat layer thereon.

* * * * *